Nov. 25, 1958 R. F. STEHLIK 2,862,061
TELEPHONE LINE LOCKOUT ARRANGEMENT
Filed Jan. 10, 1956
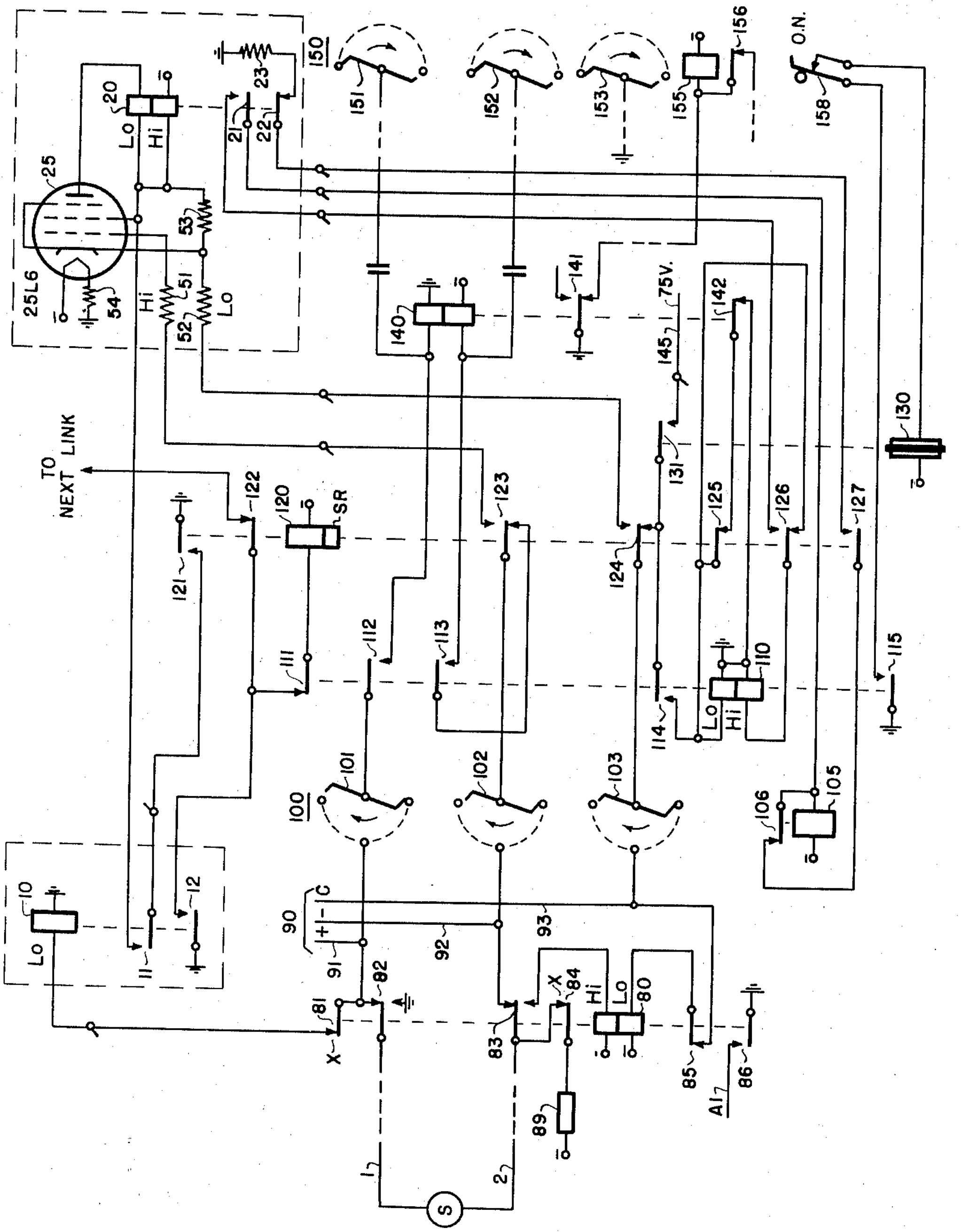
INVENTOR.
RUDOLPH F. STEHLIK
BY Wm. Walter Groves
ATTY.

United States Patent Office 2,862,061
Patented Nov. 25, 1958

2,862,061

TELEPHONE LINE LOCKOUT ARRANGEMENT

Rudolph Frank Stehlik, Antwerp, Belgium, assignor to General Telephone Laboratories, Incorporated, a corporation of Delaware Application January 10, 1956, Serial No. 558,331
11 Claims. (Cl. 179—18)

The present invention relates to automatic telephone systems, and is particularly directed to automatic means for disconnecting faulty lines known as "permanents."

In telephone practice the word "permanents" is a general term most commonly applied to subscriber lines which cause a false seizure of call initiating equipment in an exchange. This false seizure may be due to a short circuit or a ground on the line, or it may be caused at times by a removal of a handset at the subscriber's station, not followed by dialling. The seizure of this equipment by the faulty line of course denies its use to the other subscribers, and marks that line busy to all incoming calls.

In a small exchange, such as a C. A. X (community automatic exchange) or a P. A. X (private automatic exchange), where only a limited number of communication links are available, this prolonged seizure of one or more such links by such faulty lines may be a serious matter. Such exchanges are therefore often equipped with what is known as a "line lockout" arrangement, whereby if dialling does not occur within a given time following seizure, the "permanent" line is automatically disconnected, and the held switching equipment released. The line is then maintained in this "locked out" condition until the trouble is removed.

One such arrangement for example, is shown in United States Patent 1,999,788 issued to N. H. Saunders on April 30, 1935. With this arrangement a three relay line circuit is employed, comprising the usual line and cutoff relays such as relays 6 and 5 of Fig. 1 of the patent, plus an additional lockout relay 4. Upon seizure of the line, the line relay operates over the line loop and causes the seizure of an associated switching link. The seized switching equipment in turn causes the operation of the line cutoff relay, which also operates the lockout relay, and releases the line relay. If no dialling occurs, after a predetermined interval following an "all links busy" condition, a timer releases the falsely held link and the line cutoff relay. The subscriber's line relay thereupon re-operates and locks up the slow-to-release lockout relay, the original operate circuit of which is opened by the release of the cutoff relay. With the cutoff relay normal and the lockout relay operated, marking battery from the cutoff relay is disconnected from the linefinder test contacts corresponding to this line, and the finder start circuit from this line is maintained in the open condition, even though the line relay is now again operated.

This solution to the problem is of course quite satisfactory from an operating point of view, but the use of an additional relay in every line circuit does introduce an element of cost, which is directly dependent on the number of lines.

It is accordingly an object of my invention to provide an arrangement of this general class which is both satisfactory in operation and low in cost.

It is another object of the invention to provide an arrangement of this class which is simple and direct in its action, without mechanical complications or special equipment.

A feature of the invention is the use of only one individual relay in each line circuit, which serves as a combination line, cutoff, and lockout relay, thus reducing the line circuit cost even below that of the more usual two-relay circuit.

Another feature of the invention is the provision of a vacuum tube in the test circuit of the linefinders, with resultant advantages of speed and reliability of operation.

Other objects and features of the invention will become apparent upon perusal of the following specification and claims, when considered together with the appended drawing which shows, in circuit diagram form, sufficient of the equipment of a small automatic telephone system to enable the invention to be properly described and easily understood.

With further reference to the drawing, there is illustrated, in the center, a portion of a finder-connector switching link comprising a linefinder switch 100 at the left, a connector switch 150 at the right, and a number of relays such as a switching relay 110, a finder start relay 120, a thermal type timing relay 130, and a pulsing or line relay 140. Various relays related to the connector end of the link, such as release, change-over, switching, ring-cutoff, and back-bridge relays, have been omitted, since they are not considered essential to the disclosure, and their general arrangement and functions are well known in the art.

The linefinder switch 100 is represented as a rotary type stepping switch having a motor-magnet 105 and three levels of bank contacts, and associated wipers or brushes 101, 102, 103. The connector switch 150 is represented as a similar switch, having a motor-magnet 155, off-normal springs 158, and three levels of bank contacts, and associated wipers 151, 152, 153. It should be understood however, that other types of switches could be employed just as readily, as will be obvious when the invention has been more completely described. The number of contacts in each level is also immaterial to the invention.

At the left of the drawing there is shown a subscriber line, comprising a subscriber station S and two line wires 1 and 2, which are connected, by way of the subscriber's line circuit, to the contact banks of the linefinder. The line circuit line and test conductors are also multiplied, in the usual manner, to the corresponding contact banks of the connectors serving the same group of lines, by way of the "line normal" conductors 90.

The subscriber's line circuit consists essentially of a single, two-winding relay 80, having no special electrical or mechanical features, except that it is marginally adjusted to operate in two steps, so as to open only the break contacts 81 and 84 upon a normal energization, and to operate its remaining contacts only upon energization by a higher current flow. Also associated with the subscriber's line circuit is an individual impedance coil 89, and a start relay 10 which is common to a plurality of line circuits and links.

In the upper right corner of the drawing is shown a finder stopping relay 20 and an associated vacuum tube 25, which are also common to a plurality of links. The vacuum tube illustrated is a beam power amplifier pentode tube having the usual plate, suppressor grid, screen grid, control grid, cathode, and filament. The plate is connected to one side of the stop relay 20, while the cathode, which is connected to the suppressor grid, is connected to the other side of relay 20, through a 1200 ohm resistor 53. The suppressor grid and cathode are also arranged to be connected to the finder test wiper 103 during the finder operation, through a 200 ohm resistor 52, while the control grid is arranged to be connected at the same time to the finder line wiper 102, through a 15,000 ohm resistor 51. During this time also, the screen grid is connected to direct exchange ground, through contacts 11 and 121. The filament is heated from the exchange battery, through a resistor 54. In the drawing, the ground signs indicate the positve side of this battery, which is grounded, while the minus signs indicate the negative side of the battery. In the normal condition of the circuit the control grid of the tube is open, and the other electrodes are connected to negative battery through the windings of relay 20.

The operation of the equipment is as follows. When the receiver or handset is removed at the subscriber station S to initiate a call, the common start relay 10 is operated immediately, by ground through its winding, contacts 81, 82, line conductor 1, the hookswitch contacts not shown, in the subscriber's telephone, line wire 2 contacts 83, 84, and through impedance coil 89 to negative battery.

Start relay 10 upon operating, at contacts 11 prepares a priming circuit for stop relay 20, and at contacts 12 closes a start circuit through contacts 111 to finder start relay 120, and by way of contacts 122 to the other links of the group, whose relays 120 are connected sequentially in multiple in this circuit.

The illustrated linefinder start relay 120 operates over this start circuit, and at contacts 122 disconnects the start circuit from the other links, in time to prevent their finder switches from operating. Relay 120 at the same time, at contacts 121 connects a positive voltage through contacts 11 to the screen grid of the tube, and also to the plate through the upper winding of relay 20, which may be assumed to have a resistance of approximately 1000 ohms. The lower winding of relay 20, which may be assumed to have a resistance of some 3000 ohms, is energized in a branch of this circuit, in obvious manner. The resultant current flow is insufficient to operate the relay, but makes it faster to operate.

Finder start relay 120 also upon operating, at make contacts 123 connects the control grid of the tube to the finder line wiper 102, at make contacts 124 connects the cathode and suppressor grid to the finder test wiper 103, at contacts 125 and 126, prepares a circuit for switching relay 110, and at make contacts 127 closes a self-interrupting circuit to the finder motor-magnet 105, from ground through the low resistance 23, and contacts 22, 127, 106 to battery through the motor-magnet.

Motor-magnet 105 now starts to operate and release at high speed, and at each release advances the wipers 101, 102, 103 one step in well known manner, in search of the calling line. When the wipers reach the bank terminals of the calling line, negative potential through the low resistance winding of relay 80 is connected to the suppressor grid and cathode of tube 25 through wiper 103, while positive potential is connected to the control grid over wiper 102 as follows: ground through the 50 ohm start relay 10, contacts 81, 82, calling subscriber's telephone and line, contacts 83, wiper 102, contacts 123, and the 15,000 ohm resistor 51 to the control grid. This positive potential on the control grid makes the tube conductive, and current flows between cathode and plate and through the upper low-resistance winding of stop relay 20 and the 1200 ohm resistor 53.

Stop relay 20 operates quickly in this circuit, and at its contacts 22 opens the self-interrupting circuit of motor magnet 105, now in the released position, thereby preventing the re-operation of this magnet. Relay 20 also, at its contacts 21 completes a circuit for switching relay 110 as follows: ground, the lower high-resistance winding of relay 110, make contacts 126 and 21 and the winding of motor-magnet 105 to negative battery. Due to the high resistance of this circuit motor-magnet 105 is not visibly affected, but relay 110 operates quickly.

Switching relay 110 upon operating over the foregoing circuit, at its contacts 111 disconnects finder start relay 120 from the start circuit, at contacts 112, 113 prepares the operating circuit of the front bridge pulsing relay 140, at contacts 114 prepares the operating circuit to the line cutoff and lockout relay 80, and at contacts 115 closes a circuit through the connector off-normal springs 158 to thermal relay 130, which starts heating.

Finder start relay 120, which is made slightly slow to release, as by the use of a copper slug on the heel end of the core, releases after a short delay following the opening of its circuit by relay 110. Relay 120 thereupon, at its contacts 121 disconnects positive potential from the plate of the tube and from relay 20, and at make contacts 123 and 124 disconnects the other electrodes from the wipers. The tube thereupon ceases to conduct, and stop relay 20 releases. Relay 120 also at contacts 127 disconnects the interrupter circuit of the motor-magnet 105, at make contacts 126 disconnects the motor-magnet battery from relay 110, at break contacts 125 and 126 shunts the windings of relay 110 to make this relay slow to release, and at break contacts 124, 125 connects direct ground through contacts 142, 125, 114, 124, wiper 103, and contacts 85, to the low resistance winding of cutoff relay 80. Relay 120 further, at its break contacts 123 connects pulsing relay 140 to the calling line loop, by way of contacts 112, 113, finder wiper 101, 102, and contacts 82, 83.

The subscriber's cutoff relay 80 now operates in its first step, and opens its preliminary break contacts 81 and 84. This clears the line for pulsing by disconnecting impedance 89 and start relay 10, and causes the release of the latter relay.

Pulsing relay 140 also opreates at this time, following the completion of its circuit at break contacts 123 of the finder start relay. Relay 140 thereupon, at contacts 141 prepares the connector for impulsing, in known manner, and at break contacts 142 removes the shunt from the windings of switching relay 110. The circuit to the low resistance winding of cutoff relay 80 is now through both windings of switching relay 110 in parallel as follows: ground and upper winding of relay 110 to contacts 114, and ground and lower winding of relay 110 to contacts 126 and 114, and thence to relay 80 via contacts 124, wiper 103 and contacts 85. Switching relay 110 holds in this circuit.

Subsequent re-operations of start relay 10 from other calling lines will not affect the held link, due to the open condition of contacts 111, as well as of contacts 81, 121, 123, 124, 126, 127. Such re-operation of start relay 10 will however complete a start circuit through break contacts 122 to the other links, the first idle one of which will respond in the manner described. The common elements 10, 20, and 25 are accordingly switched from link to link as required and then released. Since they are held only during the very short duration of the line-finding period, they can serve a considerable number of links.

During the foregoing line-finding operation, it will be apparent that as the wipers advance over the banks, they may pass over the terminals of both busy and idle lines before reaching those of the calling line. At the terminals of each idle line, test wiper 103 will connect the suppressor grid and cathode of the tube 25 to negative battery through the lower winding of the corresponding line relay 80 as for a calling line, but line wiper 102 at the same time connects the control grid to negative battery through the 400 ohm winding of the impedance coil 89, and the tube is prevented from conducting. At the terminals of busy lines, on the other hand, line wiper 102 will connect various values of both positive and negative potentials from the line to the tube's control grid, while test wiper 103 will connect positive from the test normal conductor to the suppressor grid and cathode. The line test circuit is thereby rendered ineffective and the tube is again prevented from conducting.

It is thus seen, that although the calling line test is made over the line, the presence of busy lines will not produce annoying line clicks, as might otherwise occur, were it not for this double control. It will also be seen that because the line test is based on polarities rather than on current flow, it imposes no appreciable limits on line lengths or resistances, beyond the normal limitations required for pulsing and speech.

Following the operation of the link's pulsing relay 140, other relays not shown, prepare the connector stepping circuits and return dial tone, in any convenient manner. The calling party, upon hearing the dial tone, dials the number of the line he wishes to call, in the usual way. Pulsing relay 140 follows the dial pulses, and steps the connector motor-magnet 155. The connector wipers 151, 152, 153 accordingly advance to the terminals of the called line, with off-normal contacts 158 opening on the first step. The connector then rings in known manner, and when the called party answers, completes the connection over the line wipers 151, 152, while test wiper 153 marks the called line busy, by connecting ground to its test normal conductor corresponding to conductor 93. This operates the called line's line relay in its first step, operating its contacts corresponding to the contacts 81, 84 to clear the called line of attachments, preparatory to speech.

Responsive to the aforementioned opening of the connector off-normal contacts 158, the circuit to thermal relay 130 is interrupted, in obvious manner. In the case of a "permanent" however, when no dialling follows seizure, the connector does not move from its normal position, contacts 158 remain closed, and thermal relay 130 continues to heat.

Thermal relay 130 accordingly, after a predetermined time interval, closes its contacts 131. Booster battery of 75 volts, which may be derived from rectified ringing voltage, is thereupon connected to the lower winding of cutoff relay 80 by way of conductor 145, contacts 131, 124, finder test wiper 103, and contacts 85. Relay 80 is thereby operated in its second step, and operates all of its contacts.

Cutoff relay 80 upon operating in its second step, at contacts 86 closes an alarm circuit, at contacts 85 disconnects the lower winding of relay 80 from the test normal conductor, at break contacts 82, 83 disconnects the line from the switching equipment, and at make contacts 82, 83 completes an obvious circuit to the upper high-resistance winding of the line cutoff and lockout relay 80 is now locked operated over its upper winding and the line, and will remain in this condition, completely disconnected from the exchange, and unable to make or receive calls, until the trouble condition has been removed. If the "permanent" is caused by a ground on the negative side of the line rather than a short circuit, relay 80 will of course lock to this ground rather than to contacts 82.

Responsive to the disconnection of the wipers, also, link relays 110, 130 and 140 are released, and the link is thereby restored to its normal condition, and made again available for common use.

It should be understood that various changes may be made in the particular embodiment of the invention here described and illustrated, without departing from the spirit and scope thereof, as defined in the appended claims. Two-motion switches may be employed, for example, the second switch could be a selector, and the cutoff relay 80 could be arranged to operate in its first step through a fairly high resistance, and in its second step by direct ground from contacts 131, especially if a 48 volt exchange battery is used. The resistances given herein are for 24 volt operation.

What is claimed is:

1. In an automatic telephone system, a switching link and a subscriber line accessible thereto, a start relay and a two-step cutoff relay for said line, means for operating said start relay responsive to a calling condition on said line for causing said link to connect itself to said line, electronic means connected with said link, a first and second potential connected from said line to said link responsive to said connection for activating said electronic means to cause said link to maintain said connection with said line, means for operating said cutoff relay in its first step from said link to disconnect said start relay from said line in response to the activating of said electronic means, control means for further operating said link over said line to further extend said connection, and means effective automatically when said control means is not exercised within a given time for operating said cutoff relay in its second step to disconnect said line from said link for as long as said calling condition persists thereon.

2. In an automatic telephone system, a switching link, a subscriber line accessible to said link, a start relay and a two-step cutoff relay for said line, means for operating said start relay from said line responsive to a calling condition thereon for causing said link to connect itself to said line, electronic means connected with said link, a first and second potential connected from said line to said link responsive to said connection for activating said electronic means to cause said link to maintain said connection with said line, means operated responsive to said activation to cause said link to maintain said connection and operate said cutoff relay in its first step over said winding thereof, means operated responsive to said last operation to disconnect said start relay from said line in response to the activating of said electronic means, control means for further operating said link from signals received thereby over said line to further extend said connection, means effective automatically when such signals are not received within a given time for operating said cutoff relay in its second step from said link, over said winding thereof, and means operated responsive to said control operation for disconnecting said cutoff relay and said line from said link, and for locking said cutoff relay to said line.

3. In an automatic telephone system having a plurality of subscriber lines and a plurality of links having access thereto, a start relay common to said lines, a two-step cutoff relay for each of said lines, means for operating said start relay responsive to a calling condition on any one of said lines, means operated responsive to said start relay operation for causing one of said links to connect itself to said start and cutoff relays, electronic means activated from said start and cutoff relays responsive to said connection, relay means operated in response to said activation for causing said link to hold said connection, and for operating said cutoff relay in its first step over said connection, means operated responsive to said last two operations for disconnecting said electronic means from said link and said start relay from said line, means for further operating said link from said line over said connection for further extending said connection, timing means effective whenever said further operation does not occur within a given time for operating said cutoff relay in its second step over said connection, and means operated responsive to said last operation for interrupting said connection and releasing said link.

4. In a telephone system as in claim 3, three selectively operable connecting points for connecting said link to said start and said cutoff relay, means for controlling said activation of said electronic means over a pair of said points, means for controlling said further operation of said link over a different pair of said points, and means for controlling said operations of said cutoff relay over only one of said points.

5. In an automatic telephone system comprising a switching link and a line accessible thereto, three points of ingress to said link, a start relay and a two-step relay for said line, means for operating said start relay over said line responsive to a calling condition thereon for seizing said link and causing it to connect itself to said line over two of said points of ingress, and to said cutoff relay over the other of said points, electronic test means for said link activated in response to said connection under control of potentials extended thereto over one of said first points of ingress and said other, means operated responsive to said activation for operating said cutoff relay in its first step from said link over said other point of ingress for disconnecting said line relay from said line, and timing means in said link effective at times for operating said cutoff relay in its second step over said other point of ingress for disconnecting said start and said cutoff relay from said points of ingress and releasing said link.

6. Switching equipment for use in an automatic telephone system having a plurality of switching links and a plurality of subscriber lines accessible thereto including, a first and a second switch for each link, a vacuum tube common to said links, a start relay common to said lines, a two-step cutoff relay individual to each line, means for operating said start relay responsive to a calling condition on any one of said lines, means operated responsive to such operation for causing the first switch of one of said links to hunt said line, three selective points for said first switch, means for activating said tube under control of said start and cutoff relays over two of said points responsive to said switch finding said line, means operated responsive to said activation for stopping said hunting and extending control of said second switch to said line over one of said two points and the third point, other means operated responsive to said activation for operating said cutoff relay in its first step from said link over one of said first two points to enable said last control, means effective only where said last control is not exercised within a given time for operating said cutoff relay in its second step over said one point, and means operated in response to said last operation for disconnecting said link from said start and said cutoff relay, and for maintaining it so disconnected.

7. Switching equipment as in claim 6, including means for restoring said start relay to common use responsive to said enabling operation, and means for restoring said vacuum tube to common use responsive to said control extending operation.

8. Equipment for use in an automatic telephone system having a plurality of subscriber lines, including, a switching link and a linefinder therefor, an electronic device for said link, two control electrodes for said device, a pair of line terminals and a test terminal in said finder for each line, a cutoff relay for each line, means responsive to a calling condition on any one of said lines for causing said finder to hunt said line, means operated responsive to said finder finding said line for actuating said device from potentials connected to said electrodes from said line and said cutoff relay via said line's line and test terminals, means for stopping said hunting responsive to said actuation, means effective when said finder passes over an idle line while hunting for disabling said device by a blocking potential connected to one of said electrodes over one of said idle line's finder terminals and means effective when said finder passes over a busy line for disabling said device by a blocking potential to the other of said electrodes over one of said busy line's finder terminals.

9. Switching equipment as in claim 8, wherein said activating potentials comprise a positive potential connected to a line terminal and a negative potential connected to the test terminal, while said blocking potentials comprise respectively a negative potential connected to the line terminal, and a positive potential connected to the test terminal.

10. Switching equipment as in claim 8 including means whereby one of said actuating potentials and one of said blocking potentials is connected to said electronic device via the test terminal of the line involved, means operated responsive to said actuation of said device for partly operating the calling line's cutoff relay from said link over said line's test terminal to clear said line of attachments, and means for subsequently fully operating said relay at times from said link over said test terminal for disabling said calling line and releasing said link.

11. Switching equipment for use in an automatic telephone system comprising subscriber lines and a switching link for extending connections therefrom, a finder switch for said link, two line terminals and a test terminal in said finder for each line, a cutoff relay for each line, an electronic stopping device for said finder, means operated responsive to a calling condition on any one of said lines for causing said finder to find said line, means effective when said line is found for actuating said electronic device in response to controls exercised in part over said line's test terminal, means operated responsive to such actuation for extending further control of said link to said line via said line's line terminals, means operated responsive to such operation of said control extending means for operating said cutoff relay from said link over said test terminal to enable said control, and means for further operating said relay at times from said link over said test terminal for disabling said control and freeing said link from said line.

References Cited in the file of this patent

UNITED STATES PATENTS

| | | |
|---|---|---|
| 2,344,653 | Staszak | Mar. 21, 1944 |
| 2,502,415 | Bray et al. | Apr. 4, 1950 |
| 2,662,119 | Buchner | Dec. 8, 1953 |
| 2,731,514 | Obermann | Jan. 17, 1956 |